April 1, 1952 W. J. SCHACHT 2,591,301
FOOD SAVER
Filed Feb. 2, 1950
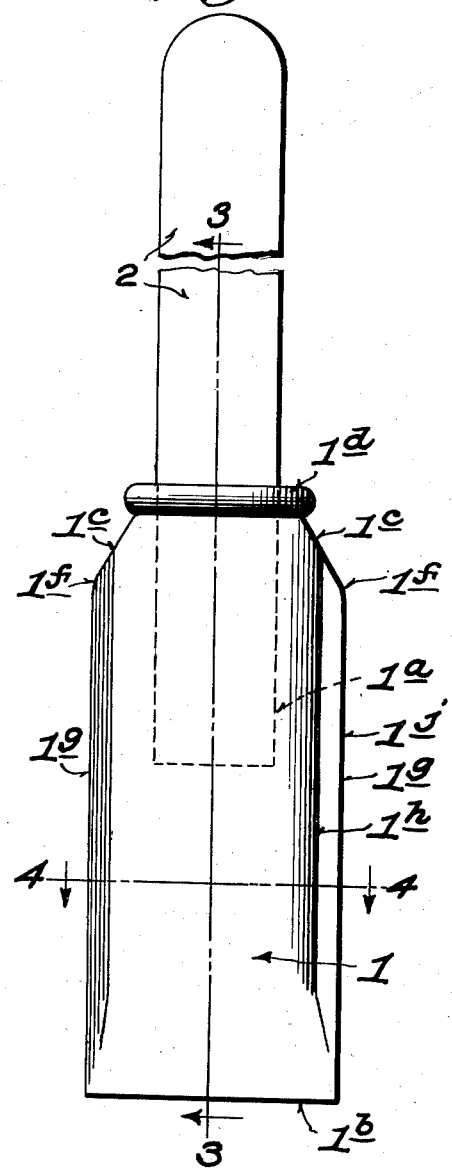
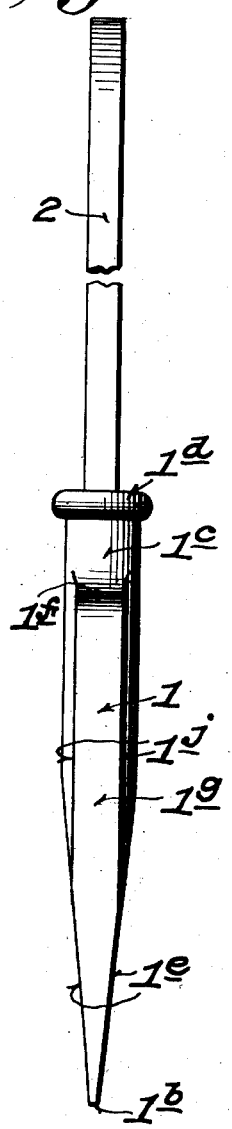
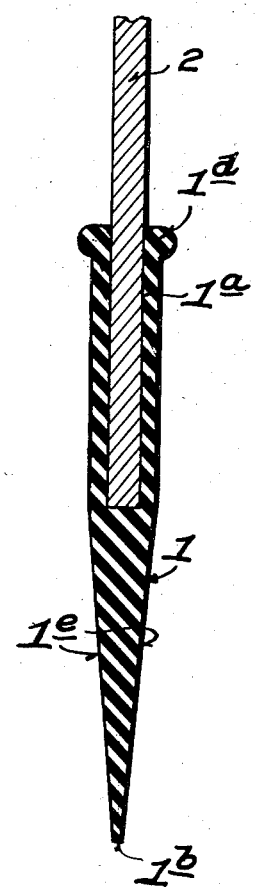
INVENTOR
William J. Schacht
BY
ATTORNEYS Patented Apr. 1, 1952

2,591,301

UNITED STATES PATENT OFFICE 2,591,301

FOOD SAVER

William John Schacht, Huntington, Ind.

Application February 2, 1950, Serial No. 141,910

3 Claims. (Cl. 15—245)

This invention is a new and novel food saving device, in the nature of a spatula, adapted to remove all the contents of small-necked or other containers, such as cream bottles, jelly bottles, small mayonnaise jars, baby food jars, and many other small or large mouthed containers. Usually housewives attempt to remove the last bit of food from such containers by means of a teaspoon or a knife, and consequently a great deal of food is wasted because of the lack of proper means of removing all of the food or the like from the container.

The principal object of my invention is to provide a food saver of the above type which will remove substantially all of the contents of the container, the same embodying novel features of construction as hereinafter set forth.

I will explain the invention with reference to the accompanying drawing, which illustrates one practical embodiment thereof, to enable others familiar with the art to adopt and use the same; and will summarize in the claims the novel features of construction for which protection is desired.

In said drawing:

Figure 1 is a front elevation of my novel food saver.

Figure 2 is a side elevation thereof.

Fig. 3 is a longitudinal section on the line 3—3, Fig. 1.

Fig. 4 is a transverse section on the line 4—4, Fig. 1.

As shown in the drawing, my novel food saver preferably comprises a substantially rectangular body 1 of rubber or the like, having a handle receiving recess 1a in its rear end, the rear edge being of less width than the forward edge 1b, shoulders 1c connecting the sides of body 1 with the rear edge, which edge is provided with a reinforcing bead 1d. Into the recess 1a is entered the end of a wooden or other handle 2, the same making a tight frictional fit therein. As shown, the recess 1a extends approximately half the length of body 1, so that the forward portion thereof is very flexible, the forward half portion beyond the inner end of the recess 1a being tapered as at 1e on its front and rear faces. The forward edge 1b is straight and blunted, and is disposed substantially normal to the axis of the body 1.

As shown in Fig. 1, the edges 1c are preferably rounded as at 1f with respect to the side edges 1g of the body, for the purposes hereinafter described.

As shown, the side edges 1g are blunt. However, on the front and rear faces of the body 1, adjacent the side edges 1g, are grooves 1h forming lips 1j, for the purpose hereinafter described.

The food saver, as above described, possesses various advantages; for instance, the rounded portions 1f, between the side edges 1g and the shoulders 1c, permit the device when entered into a small-necked container, to engage the shoulders of the container near the neck so that any food or the like which is lodged or retained near the neck may be removed by manipulating and rotating the device with the rounded shoulders 1f engaging the container shoulder below the neck. Also, since the forward edge 1b of the food saver is blunted or squared, the same may be readily manipulated to remove the contents from the bottom and corners of the container.

The straight side edges 1g are adapted to engage the sides of the container, and since each of the side edges 1g is grooved as at 1h, forming lips 1j, any last remaining food or the like on the sides of the container may be readily engaged by the food saver and removed. Thus my food saver will efficiently clean all parts of a small-mouthed or large-mouthed jar.

The rubber blade 1 may be made of greaseproof material which is flexible and which will withstand deterioration by oily and fatty foods. The food saver may also be used for cleaning electric mixer blades with great efficiency. The rounded portions 1f are adapted to fit substantially exactly the rounded shoulders of glass jars and bottles. The bead 1d adds strength to the blade by reinforcing the handle opening. The forward edge 1b of the flat tapered blade is especially adapted to provide a good scraping surface.

I do not limit my invention to the exact form shown in the drawing, for obviously changes may be made therein within the scope of the claims.

I claim:

1. A food saver, comprising a flexible flat body of substantially rectangular shape having a recess in its rear end; a handle frictionally retained in said recess; said rear end being of reduced width and the side edges of the body adjacent the rear end converging inwardly and being rounded into the side edges of the major portion of the body; the forward portion of the body being tapered on its front and rear faces and terminating in a straight forward edge disposed substantially normal to the axis of the handle; the side edges of the body throughout the major portion thereof being blunt and the front and rear faces of the body having grooves therein adjacent the side edges forming with the side edges lips extending to points adjacent the forward edge of the body.

2. A food saver, comprising a flexible flat spatula-shaped body of substantially rectangular shape having a recess in its rear end extending substantially half the length of the body; a handle frictionally retained in said recess; said rear end being of reduced width and being provided with a reinforcing bead; the side edges of the body adjacent the bead converging inwardly towards the bead and being rounded into the side edges of the major portion of the body; the forward portion of the body beyond the handle being tapered on its front and rear faces and terminating in a straight blunt forward edge disposed normal to the axis of the handle; the side edges of the body throughout the major portion of the body being blunt and the front and rear faces of the body having grooves therein adjacent the side edges forming with the side edges lips extending to points adjacent the forward edge of the body.

3. In a food saver having a flexible flat spatula-shaped body of substantially rectangular shape and having a handle, the forward portion of the body opposite from the handle being tapered on its front and rear faces and terminating in a straight blunt forward edge disposed substantially normal to the axis of the body; the side edges of the body throughout the major portion of the body being blunt and the front and rear faces of the body having grooves therein adjacent the sides edges forming with the side edges lips extending to points adjacent the forward edge of the body.

WILLIAM JOHN SCHACHT.

REFERENCES CITED

The following references are of record in the file of this patent:

UNITED STATES PATENTS

| Number | Name | Date |
| --- | --- | --- |
| 944,091 | Harn | Dec. 21, 1909 |
| 1,015,461 | Vlchek | Jan. 23, 1912 |
| 1,498,509 | Arnold | June 17, 1924 |
| 1,700,209 | Polzon | Jan. 29, 1929 |
| 1,706,408 | Miller | Mar. 26, 1929 |
| 1,919,865 | Schacht | July 25, 1933 |
| 2,065,886 | Clift | Dec. 29, 1936 |
| 2,099,030 | Morrison | Nov. 16, 1937 |
| 2,188,114 | Hubbard | Jan. 23, 1940 |
| 2,294,096 | Rice | Aug. 25, 1942 |
| 2,332,940 | Senke | Oct. 26, 1943 |
| 2,334,690 | Yden | Nov. 23, 1943 |
| 2,525,341 | Eicher | Oct. 10, 1950 |